(12) United States Patent
Ahn et al.

(10) Patent No.: US 12,728,811 B2
(45) Date of Patent: Sep. 8, 2026

(54) CRASH PAD

(71) Applicants: HYUNDAI MOTOR COMPANY, Seoul (KR); KIA CORPORATION, Seoul (KR); HYUNDAI MOBIS CO., LTD., Seoul (KR)

(72) Inventors: Gye Young Ahn, Hwaseong-si (KR); Ik Keun Choi, Yongin-si (KR); Da Som Park, Yongin-si (KR)

(73) Assignees: Hyundai Motor Company, and, Seoul (KR); Kia Corporation, and, Seoul (KR); Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/195,777

(22) Filed: May 1, 2025

(65) Prior Publication Data

US 2026/0131751 A1 May 14, 2026

(30) Foreign Application Priority Data

Nov. 14, 2024 (KR) ........................ 10-2024-0162101

(51) Int. Cl.
*B60R 21/04* (2006.01)
*B60N 3/00* (2006.01)
*B60R 7/04* (2006.01)

(52) U.S. Cl.
CPC .............. *B60R 21/04* (2013.01); *B60N 3/002* (2013.01); *B60R 7/04* (2013.01)

(58) Field of Classification Search
CPC ........... B60R 21/04; B60R 7/04; B60N 3/001; B60N 3/002
See application file for complete search history.

(56) References Cited

U.S. PATENT DOCUMENTS 2,866,891 A * 12/1958 Princ ................... B60R 11/0205 217/55
2004/0145208 A1* 7/2004 Kapteyn ................ B60K 35/60 296/70

FOREIGN PATENT DOCUMENTS

| | | | | |
|---|---|---|---|---|
| DE | 10325099 A1 * | 12/2003 | ............. | E05B 83/30 |
| DE | 102004006408 A1 * | 8/2005 | ............... | B60R 7/06 |
| DE | 102020128871 A1 * | 5/2022 | ............... | B60R 7/06 |
| FR | 2832678 A1 * | 5/2003 | ............... | B60R 7/06 |
| JP | 2004036311 A * | 2/2004 | | |
| JP | 2003013647 A * | 1/2023 | | |

(Continued)

OTHER PUBLICATIONS

Ostertag, DE-102020128871-A1, Machine Translation of Specification (Year: 2022).*

(Continued)

*Primary Examiner* — Jason D Shanske
*Assistant Examiner* — Matthew Joseph Ganci
(74) *Attorney, Agent, or Firm* — Fish & Richardson P.C.

(57) ABSTRACT

A crash pad of a vehicle includes at least one tray including at least one groove on a lateral surface and a multi-purpose box detachably mounted to at least one tray. The multi-purpose box includes a handle, a motion switch device that switches a rotational motion of the handle to a linear motion, and a first protrusion portion configured to (i) protrude to an outer side of the multi-purpose box to couple to the groove and (ii) move to an inside of the multi-purpose box based on the handle being rotated by the motion switch device.

15 Claims, 10 Drawing Sheets

(56) References Cited

FOREIGN PATENT DOCUMENTS

| | | | | | | |
|---|---|---|---|---|---|---|
| KR | 20030094092 | A | * | 12/2003 | ............ | E05B 83/30 |
| KR | 20130063240 | A | * | 6/2013 | ............ | E05B 83/30 |

OTHER PUBLICATIONS

Kato, JP 2003013647 A, Machine Translation of Specification (Year: 2003).*

Lohmann, DE 102004006408 A1, Machine Translation of Specification (Year: 2005).*

Sawatani, DE 10325099 A1, Machine Translation of Specification (Year: 2003).*

Ponthieu, FR 2832678 A1, Machine Translation of Specification (Year: 2003).*

Goto, JP 2004036311 A, Machine Translation of Specification (Year: 2004).*

KR 20030094092 A, Machine Translation of Specification (Year: 2003).*

Lee, KR 20130063240 A, Machine Translation of Specification (Year: 2013).*

* cited by examiner

CRASH PAD

CROSS-REFERENCE TO RELATED APPLICATION

The present application claims priority to Korean Patent Application No. 10-2024-0162101, filed on Nov. 14, 2024, the entire contents of which are incorporated herein by reference in their entirety for all purposes.

TECHNICAL FIELD

The present disclosure relates to a crash pad of a vehicle.

BACKGROUND

A crash pad may refer to an interior material installed in a front of an interior of a vehicle and may protect a passenger safe in a case where the passenger collides with the front side of the vehicle due to an accident and the like. For instance, the crash pad may be installed at a front inner side of a driver's seat, a passenger's seat, and the like.

Some types of vehicles, e.g., a purpose built vehicle (PBV) may provide a tray on an upper end of the crash pad for a transporter's convenience.

Automobile manufacturers may not offer various specifications of a crash pad tray, and diverse consumer needs for tray specifications may not be satisfied.

In some cases, the tray may be evaluated as not being practical due to the narrow tray space. In some cases, items accommodated in the tray may be scattered at a sudden acceleration or sudden braking in a vehicle.

SUMMARY

The present disclosure describes a crash pad of a vehicle that can satisfy diverse consumer needs by securing a wider space of a tray in the crash pad, and a customizable bespoke multi-purpose box that can be used for various purposes.

The present disclosure further describes a crash pad and a multi-purpose box that can prevent scattering at flow or collision during traveling by fix the multi-purpose box to the tray using a locking device interworking with a grip of the multi-purpose box.

According to one aspect of the subject matter described in this application, a crash pad for a vehicle includes at least one tray having a lateral surface that defines at least one groove and a box detachably mounted to the at least one tray. The box includes a handle, a motion switch device configured to switch a rotational motion of the handle to a linear motion, and a first protrusion portion configured to (i) protrude to an outer side of the box and engage with the at least one groove and (ii) move to an inside of the box based on the handle being rotated by the motion switch device.

Implementations according to this aspect can include one or more of the following features. For example, the crash pad can include a main board disposed above an upper end of a Heating, Ventilation, and Air Conditioning (HVAC) system of the vehicle, the main board including the at least one tray on an upper end thereof, a first duct cover that is coupled the main board and define a HVAC duct of the vehicle, and a second duct cover having a pair of ends that are coupled to the main board and the HVAC system, respectively, the second duct cover defining another duct of the vehicle together with the main board.

In some implementations, the at least one tray can define a space that has widths greater than 210 mm×297 mm and is configured to accommodate the box therein. In some examples, the at least one groove can include a pair of grooves facing each other.

In some implementations, the handle can include a first shaft that extends in a first direction and defines a rotational axis of the handle, and a second shaft that is parallel to the first shaft and is linked with the first shaft, the second shaft being configured to rotate together with the handle based on rotation of the handle. The motion switch device can include a link rod connected to the second shaft and configured to perform a linear motion in a second direction perpendicular to the first direction based on a rotational motion of the second shaft, the link rod including a guide portion that protrudes from an inner lateral surface and defines a first inclined surface inclined at a preset angle with respect to the first direction. The motion switch device can include a link having (i) a first end located inside the link rod, (ii) an extending portion that extends from the first end of the link, and (iii) a second end that defines the first protrusion portion at an end of the extending portion, and a spring that is disposed inside the link rod and configured to push the first end of the link in a direction toward the extending portion. The first end of the link can include a second protrusion portion that faces the first inclined surface in a direction toward a center of the link rod, where the link is configured to perform a linear motion in the first direction based on the second protrusion portion moving along the guide portion while the link rod performs the linear motion in the second direction.

In some examples, the box can include a main body and a lid linked with the main body, the lid defining an inner space, where the second shaft and the motion switch device are disposed in the inner space of the lid. In some examples, the link rod includes a hinge portion that defines a cross-section curved in a U shape and accommodates the second shaft therein, where the second shaft is configured to move in the hinge portion in a third direction perpendicular to both of the first direction and the second direction based on the handle rotating and moving the link rod in the second direction.

In some implementations, the link rod can be slidingly coupled to the box.

In some implementations, the motion switch device can further include a plurality of link fixation members that support the link and are configured to allow the link to move in the second direction. In some examples, the link can be one of a pair of links that are symmetric with respect to an axis passing through the center of the link rod in the second direction, and the guide portion can be one of a pair of guide portions that are symmetric with respect to the axis passing through the center of the link rod in the second direction.

In some implementations, the first inclined surfaces of the pair of guide portions can be inclined to become wider in a direction toward the second shaft. In some examples, the pair of links can include a third protrusion portion that protrudes toward the center of the link rod, where the spring is disposed at the third protrusion portion and configured to push the pair of links in opposite directions from each other.

In some implementations, the spring can be configured to maintain an initial state of the link, the link rod, and the handle based on no rotational force being applied to the handle. In some examples, the at least one groove can include a pair of grooves facing each other, where the first protrusion portion of the pair of links is coupled to one of the pair of grooves in the initial state.

In some implementations, the second protrusion portion of the pair of links is configured to move toward the center of the link rod based on the first inclined surfaces of the pair of guide portions moving in the second direction. In some examples, the first protrusion portion can be configured to move to the inside of the box based on the second protrusion portion moving toward the center of the link rod.

In some implementations, it can be possible to secure a wider tray space by constituting the HVAC duct and the defrost duct integrally with the main board of the crash pad, thereby minimizing a non-used space.

In some implementations, it can be possible to fix a multi-purpose box inside a tray, and thus it is possible to prevent items inside the tray from flowing while traveling or scattering due to a collision.

In some implementations, it can be possible to satisfy diverse consumer needs without modifying tray specifications by allowing a consumer to customize an attachable and detachable multi-purpose box with various purposes.

In some implementations, it can be possible to improve consumer's convenience by allowing a consumer to attach or detach the multi-purpose box by a simple act of turning a grip using a locking device interworking with the grip of the multi-purpose box.

DETAILED DESCRIPTION

Hereinafter, one or more example implementations of the present disclosure are described in detail with reference to attached drawings.

For convenience of description, the crash pad and the multi-purpose box that can be accommodated therein are described using Cartesian coordinate system X, Y, Z. Here, X axis, Y axis, and Z axis can be orthogonal to one another, and can cross one another.

Here, +X axis can be a front direction of a vehicle, and ±Y axis can be a lateral direction of the vehicle. +Z axis can be a height direction of the vehicle. It is presumed that the crash pad and the multi-purpose box are mounted on a vehicle, and thus even if the X axis, the Y axis, and the Z axis are defined based on the vehicle as described above, the definition can apply to all of the crash pad and the multi-purpose box that can be accommodated therein.

In addition, the multi-purpose box can rotate around a first axis, a direction aligned with the first axis can be referred to as "first direction", and this can be the same as ±Y axis direction. A direction horizontally perpendicular to the first direction can be referred to as "second direction", and this can be the same as ±X axis direction. A direction perpendicular to both of the first direction and the second direction can be referred to as "third direction", and this can be the same as ±Z axis direction.

Hereinafter, the crash pad is described.

In some implementations, the crash pad can include at least one tray 210 attachably and detachably mounting a box 300.

Figure 1:
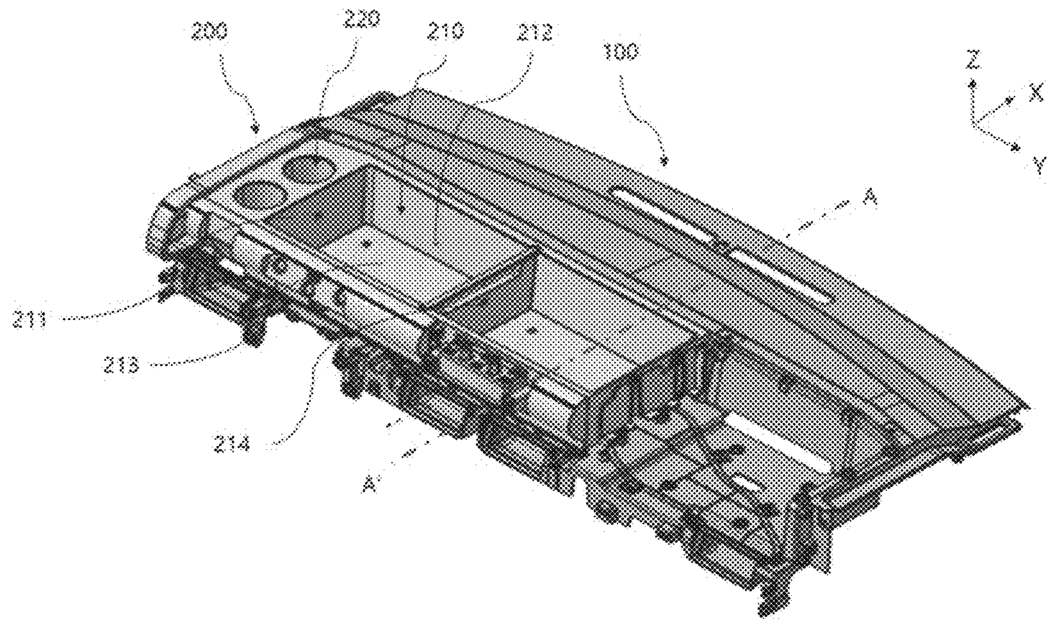
FIG. 1 is a view illustrating an example of a crash pad.
Figure 2:
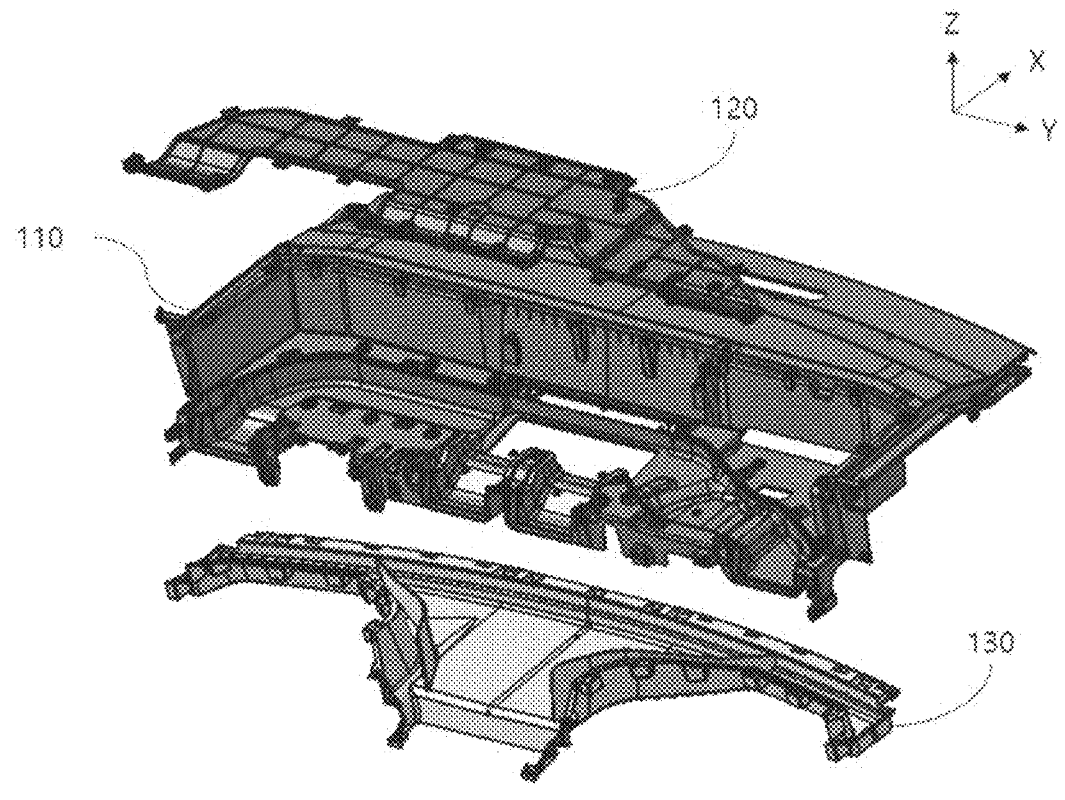
FIG. 2 is an exploded view showing example parts of the crash pad of FIG. 1.
Figure 3:
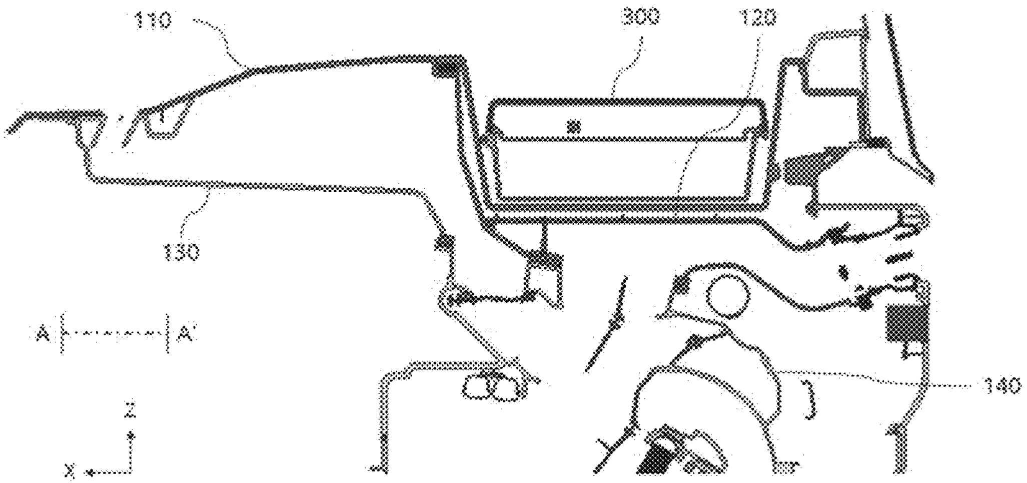
FIG. 3 is a view illustrating a cross-section taken along line A-A' of the crash pad of FIG. 1.

FIG. 1 is a view multi-purpose box illustrating a crash pad 100, FIG. 2 is an exploded view showing parts of the crash pad 100 of FIG. 1, and FIG. 3 is a view illustrating a cross-section of the crash pad 100 taken along line A-A' of FIG. 1.

Referring to FIGS. 1 to 3, the crash pad 100 can include a main board 110, a duct cover 120 (first duct cover), a defrost duct cover 130 (second duct cover), and a tray board 200. The main board 110 and the tray board 200 can be integrally formed, or constituted as separate units. In some examples, a portion at which at least one tray 210 in the main board 110 is formed can be referred to as the tray board 200.

The main board 110 can define a space where the tray board 200 is provided at an upper end, and can constitute a basic frame of the crash pad 100. The duct cover 120 is disposed on a lower portion of the tray board 200 and combined with the main board 110 to form a part, for example, a HVAC duct of a HVAC system. Both ends of the defrost duct cover 130 can be combined with a terminal end in a +X axis direction and a HVAC system 140 provided on a lower portion of the main board 110, respectively, and can form a defrost duct with the main board 110. The defrost duct may be configured to provide a passage to allow air to flow through to a window, e.g. a windshield, of a vehicle.

Figure 4:
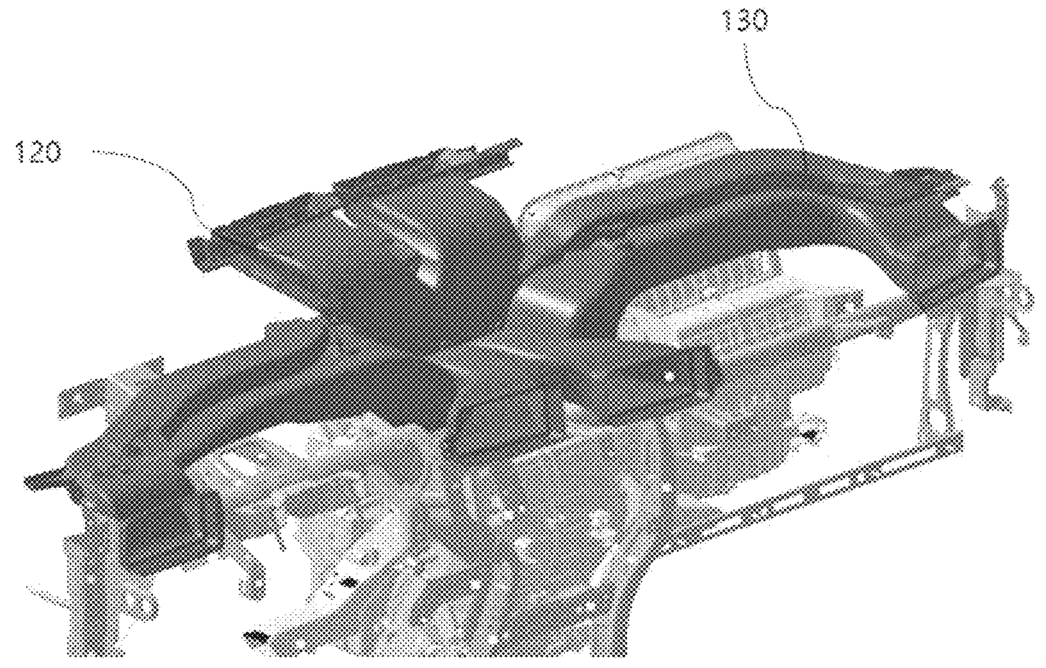
FIG. 4 is a view illustrating a duct structure according to a comparative example.

Referring to FIG. 4 illustrating an example of a duct structure in related art, where a HVAC duct and a defrost duct are constituted as separate units, and it can be disadvantageous to utilize an inner space of the crash pad 100. Therefore, the tray 210 inevitably became very small, and was formed in an inefficient shape.

In some implementations, referring to FIG. 3, compared to the example in FIG. 4, it can be possible to minimize a non-used space inside the main board 110 by integrally constituting the HVAC duct and the defrost duct with the main board 110 of the crash pad 100 and to secure a wider space where the tray board 200 is provided by dramatically reducing the number of parts. With such a structure, the crash pad 100 can ensure an open tray 210 structure with a depth enough to mount the box 300.

The tray board 200 can include at least one tray 210. FIG. 1 illustrates an example of two trays 210 and two cup holders 220 provided in the tray board 200.

In each tray 210, the box 300 can be attachably and detachably mounted. The box 300 can have a multi-purpose function, for example, a cabinet, a toolbox, a document box, and the like. The multi-purpose box can be manufactured in various sizes depending on the usages, and can be customized according to consumer needs within a possible volume limit. For example, the box 300 can be a multi-purpose box that can be used for various purposes, e.g., storages for tools, stationery, documents, cosmetics, medicines, emergency kits, etc. The box 300 can have various shapes including square, rectangular, round, triangular, and cylindrical cross-sectional shape.

Therefore, the tray 210 can have an accommodating space of a size in which the box 300 is included. A bottom surface 213 of the tray 210 can have an area wider than an A4 paper (210 mm*297 mm). In some examples, the bottom surface 213 can have an area smaller than the A4 paper.

The tray 210 can be in a hexahedral shape with an upper portion opened, but is not limited thereto.

The tray 210 can include at least one groove 214 on a lateral surface 211 in a Y axis direction. In the groove 214, a first protrusion portion 330-1 of the box 300, to be described later, can be inserted or combined. Therefore, each tray 210 can include two grooves 214, for example, a pair of grooves 214 facing each other in the Y axis direction.

Since the pair of grooves 214 are combined with the first protrusion portion 330-1 of the box 300, the box 300 can be fixed to the tray 210, and with this, it is possible to prevent the box 300 from unstably shaking or sticking out during driving or in an accident.

Hereinafter, referring to FIGS. 5 to 9, the box 300 that is attachably and detachably mounted on the tray 210 is described.

Figure 5:
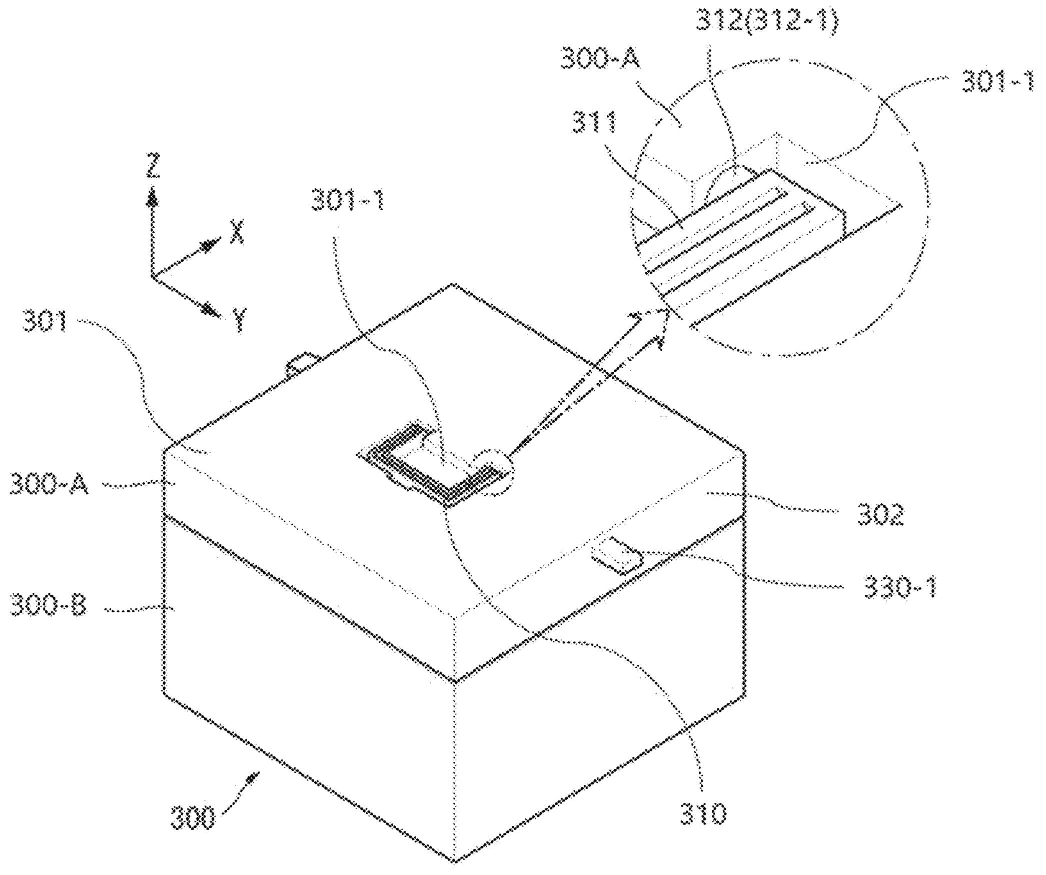
FIG. 5 is a view showing an example of a multi-purpose box and a portion of the box.
Figure 6:
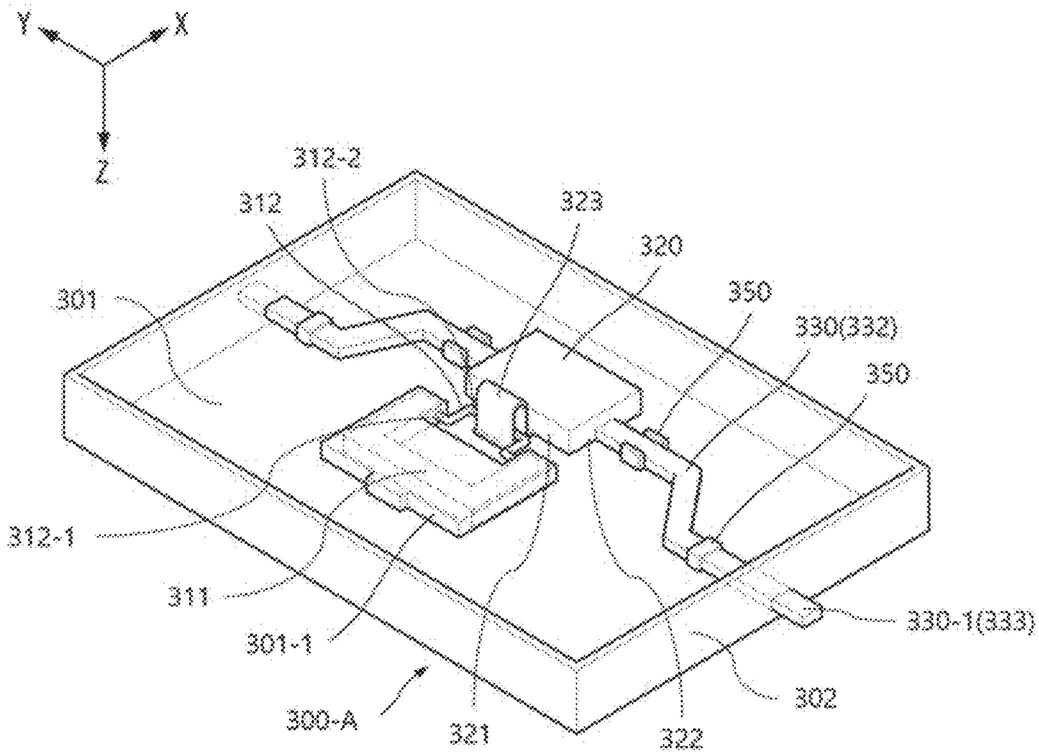
FIG. 6 is a perspective view illustrating an inside of an example of a lid of the multi-purpose box according to FIG. 5.
Figure 7:
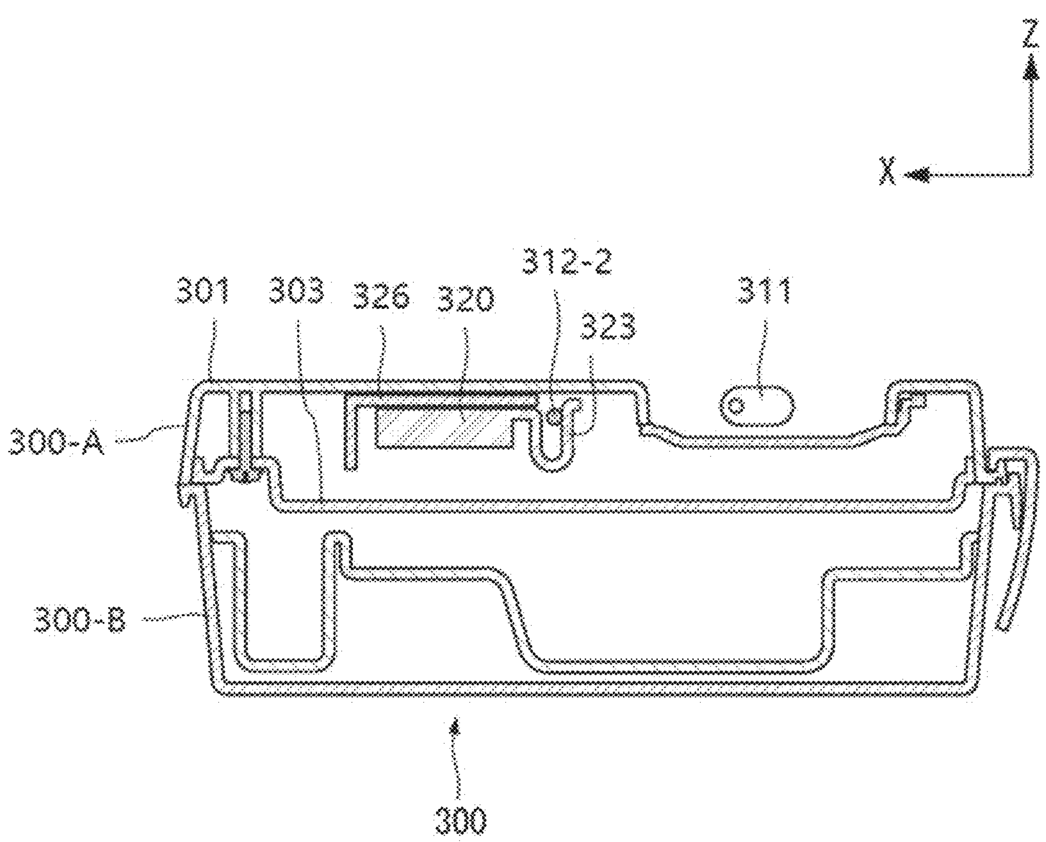
FIG. 7 is a cross-sectional view of the multi-purpose box according to FIG. 5 taken along the X-Z plane.
Figure 8A:
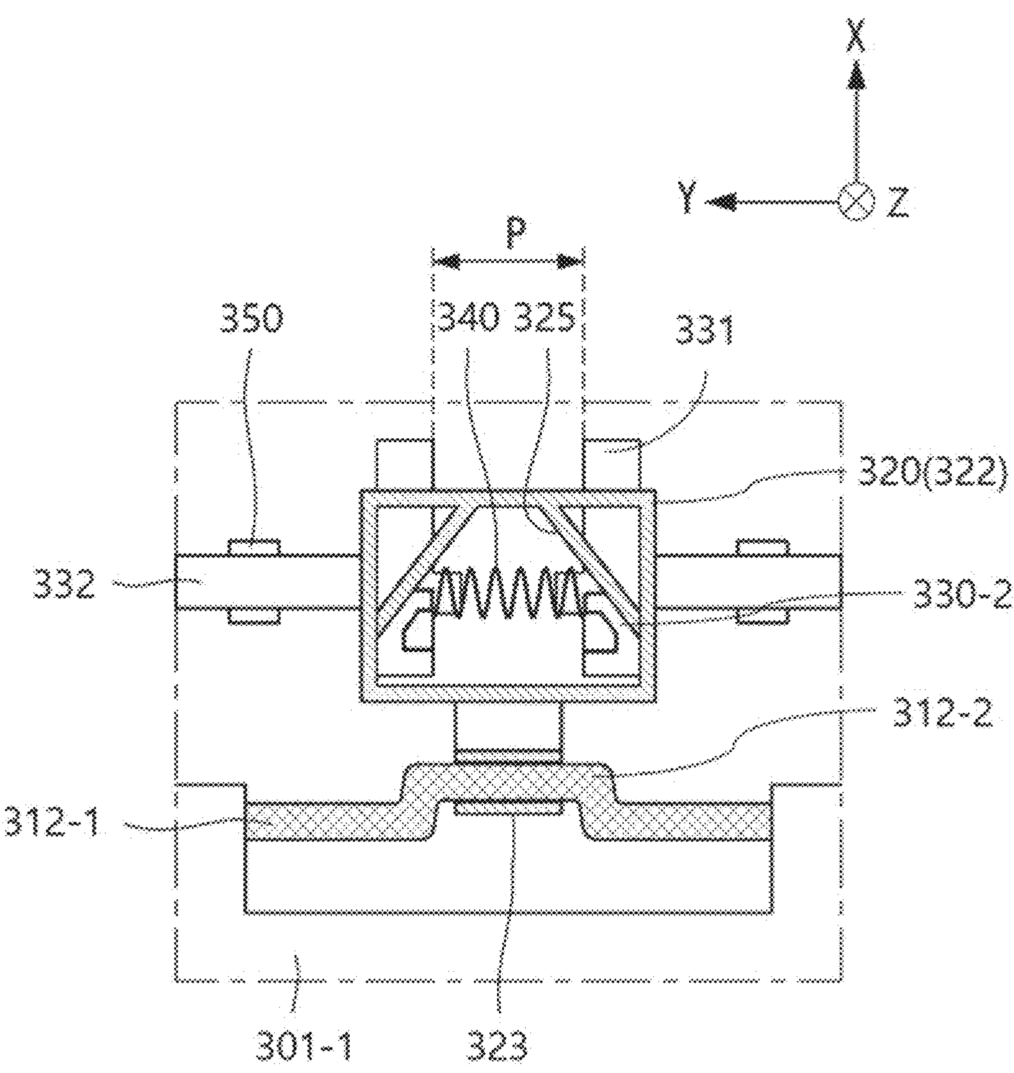
FIGS. 8A and 8B are planar enlarged views of FIG. 6 taken along the X-Y plane.
Figure 8B:
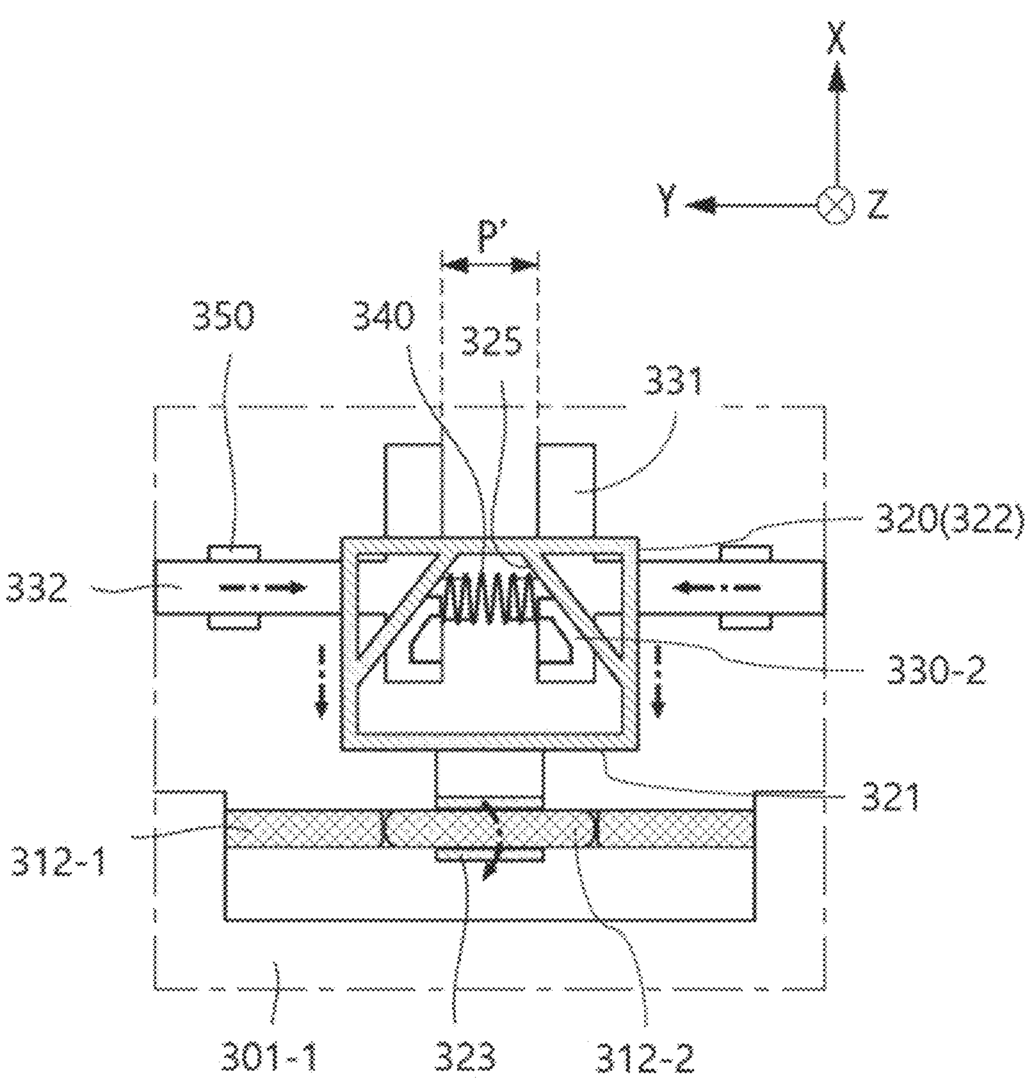
Figure 9:
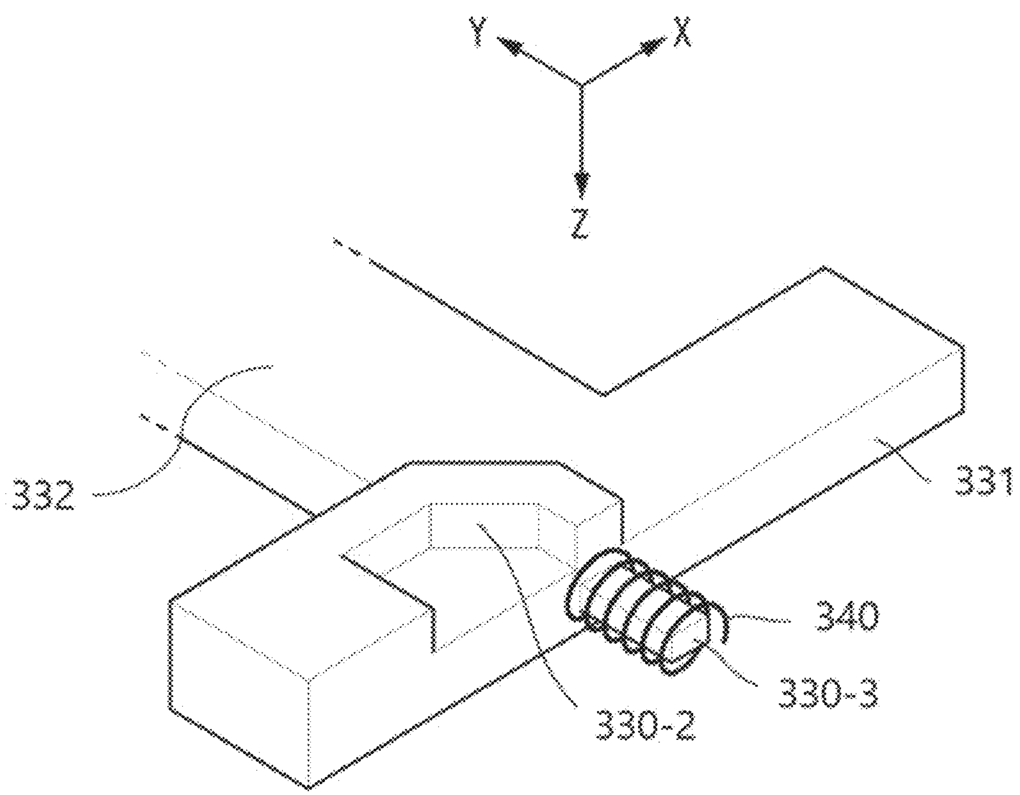
FIG. 9 is an enlarged view showing an example of a link disposed inside a link rod in FIG. 6.

FIG. 5 is a view enlarging the multi-purpose box and a portion, FIG. 6 is a perspective view illustrating an inside of a lid 300-A of the box 300 according to FIG. 5, FIG. 7 is a cross-sectional view of the box 300 according to FIG. 5 taken along X-Z plane, and FIGS. 8A and 8B are views illustrating a planar enlarged view of FIG. 6 taken along line B-B'. FIG. 9 is a view enlarging a link inside a link rod 320 in FIG. 6.

FIG. 5 illustrates a shape of the box 300 as a hexahedron for convenience of description, but the multi-purpose box is not limited thereto, and can have a specific shape other than hexahedron as illustrated in FIG. 7.

The box 300 can include a main body 300-B that can accommodate items inside and the lid 300-A. The main body 300-B and the lid 300-A can be linked via a hinge combining.

The lid 300-A can include a handle 310 and a motion switch device that switches a rotational motion to a linear motion.

The handle 310 can include a grip 311 and a shaft 312 linked with the grip 311. The shaft 312 can be bent in a □-shape, and can include a first shaft 312-1 and a second shaft 312-2 parallel to each other.

The grip 311 can be disposed in a concave groove 301-1 on an upper surface 301 of the lid 300-A. The first shaft 312-1 is combined with the grip 311 and can rotate together with the grip 311 when the grip 311 rotates.

The first shaft 312-1 can penetrate a portion of a lateral surface forming the groove 301-1, and therefore, the grip 311 can perform a rotational motion having the first shaft 312-1 as a rotational axis.

The second shaft 312-2 can be parallel to the first shaft 312-1, and the first shaft 312-1 and the second shaft 312-2 can be spaced with a preset distance. Therefore, the second shaft 312-2 can perform a circular motion with the preset distance as a radius around the shaft 312-1.

In addition, the second shaft 312-2 can be located in a direction opposite to a direction in which that the grip 311 is formed from the first shaft 312-1. Referring to FIG. 6, in a case where a user pulls the grip 311 in a Z direction, the handle 310 rotates around the first shaft 312-1, the second shaft 312-2 located on a side opposite to the grip 311 can move in an opposite direction-Z axis direction to a movement direction +Z axis direction of the grip 311. That is, the grip 311 and the second shaft 312-2 can move in a direction opposite to each other from the first shaft 312-1. In some examples, the first shaft 312-1, the grip 311, and the second shaft 312-2 have the same rotational direction.

The lid 300-A can include an inner space with four sides blocked. Referring to FIG. 7 illustrating a cross-section of the box 300 of FIG. 5 taken along X-Z plane, the lid 300-A can be formed of an outer cover including an upper surface 301 and a lateral surface, and an inner cover forming a lower surface 303. However, the lid 300-A is not limited thereto, and can have a shape with the lower surface open, that is, have no inner cover. In FIG. 6 illustrating the inner space of the lid 300-A, the lower surface 303 of the lid 300-A is not illustrated for convenience of description.

The inner space of the lid 300-A can include a motion switch device.

Referring to FIGS. 6, 8A, and 8B, the motion switch device can include the link rod 320 linked with the second shaft 312-2, a pair of links 330 linked with the link rod 320, a spring 340 disposed between the pair of links, a link fixation member 350 that fixes the link 330, and a rod combining portion 360 that links the link rod 320 and the box 300.

The link rod 320 is linked with the second shaft and can perform a linear motion in a X axis direction by a rotational motion of the second shaft. For this, the link rod 320 can include a hinge portion 323 with a cross-section taken along XZ plane curved in a 'U' shape such that the second shaft 312-2 is disposed inside the link rod 320.

Referring to FIG. 6, the link rod can include the hinge portion 323 on a lateral surface 321 in a direction in which the groove 301-1 where the grip 311 is disposed is formed. When the grip 311 moves in the +Z axis direction and rotates in a counterclockwise direction based on XZ plane from the first shaft 312-1, the second shaft 312-2 similarly performs a rotational motion in the counterclockwise direction from the first shaft 312-1, and this can be considered a sum of a motion in the Z axis direction and a motion in the X axis direction. The second shaft 312-2 moves in a-Z axis direction in the hinge portion 323 and moves the link rod 320 in a-X axis direction.

A height of the hinge portion 323 can be longer than a distance preset distance between the first shaft 312-1 and the second shaft 312-2. Therefore, even if the second shaft 312-2 rotates, the second shaft is not physically bumped against or blocked by the hinge portion 323, and can perform a linear motion in the −Z axis direction in the hinge portion 323.

Referring to FIG. 7, the link rod 320 can be attached onto the upper surface 301 of the lid 300-A via the rod combining portion 360. The rod combining portion 360 can include a combining structure such that the link rod 320 can be slid in the X axis direction in a state of being attached onto the upper surface 301. With this, the link rod 320 can be slidingly combined to the box 300.

In addition, the link rod 320 can include one end 331 of the link and the spring 340 inside, and includes a guide portion 325 that protrudes to an inside of the link rod. These are described later.

The link 330 can be formed of a pair of links 330 symmetric in the Y axis direction from a center of the link rod 320.

Each of the pair of links 330 can include the one end 331 provided inside the link rod 320, the other end 333 forming the first protrusion portion 330-1 that protrudes to an outside of a third lateral surface 302 of the lid 300-A, and an extending portion 332 linking the one end 331 and the other end 333.

Since the one end 331 of the link is disposed inside the link rod 320, the link rod 320 can include a hole through which the link 330 penetrates on the lateral surface 322 in the Y axis direction. That is, the extending portion 332 extending from the one end 331 of the link in the Y axis direction penetrates through the hole located on the lateral surface in the Y axis direction of the link rod 320 and extends in the first protrusion portion 330-1 which is the other end 333 of the link.

The one end 331 of the link can be in a shape extending in the X axis direction. A terminal end of the one end 331 of the link in the +X axis direction can be exposed to an outside of the link rod 320, and thus the link rod 320 can include a hole through which the one end 331 of the link penetrates on a lateral surface in the +X axis direction. In some examples, the link can move in the Y axis direction, the hole to be formed on the lateral surface of the link rod 320 in the +X axis direction can be a hole that extends in the Y axis direction to correspond to a movement amount of the link.

The extending portion 332 can extend from the one end 331 to the other end located in a +Y axis direction or −Y axis direction. In addition, the extending portion 332 can be in a linear shape, or can be in a shape bent such that the first protrusion portion 330-1 is located in a center or a specific point of the third lateral surface 302 of the lid 300-A.

The other end 333 of the link can be the first protrusion portion 330-1. The first protrusion portion penetrates the box 300 or the lateral surface 302 of the lid 300-A in the Y axis direction to protrude to the outside of the box 300. Therefore, the lateral surface 302 can include a hole through which the first protrusion portion 330-1 passes. The first protrusion portion 330-1 that protrudes to the outside of the box 300 can be engaged with the pair of grooves 214 formed on a first lateral surface 211 of the tray 210 in the crash pad 100.

The link fixation member 350 is fixed on an inner side of the upper surface 301, and combined with the extending portion 332 to play a supporting role when the link 330 moves in the +Y axis direction or the −Y axis direction. By the link fixation member 350, the link 330 may not be moved in a direction other than the +Y axis direction or the −Y axis direction, and it is possible to prevent the link extending portion 332 from being folded or broken by a force by applying multiple link fixation members 350 to the link 330. For example, the link fixation member 350 can include a plurality of protrusions the protrude from a surface of the lid 300.

The link 330 can be moved in the Y axis direction by the link rod 320. This is described with reference to FIGS. 8A and 8B.

FIGS. 8A and 8B are views enlarging a ⅔ point of the link rod 320 from the upper surface 301 taken along XY plane. Therefore, the link rod 320 and the hinge portion 323 illustrate a cross-section indicated by oblique lines. The first shaft 312-1 and the second shaft 312-2 are indicated by check patterns for easy distinction.

FIG. 8A illustrates an aspect of an initial state before the grip 311 rotates, and FIG. 8B illustrates an aspect where the grip 311 is rotated by 90°. Therefore, in FIG. 8B, the second shaft 312-2 can be located in the first shaft 312-1 on the figure, and thus the link rod 320 including the hinge portion 323 linked with the second shaft 312-2 can move in the −X axis direction.

Referring to FIG. 9 which is a figure enlarging the one end 331 of the left link in FIG. 8A, the one end 331 of the link can include a second protrusion portion 330-2 that protrudes in the −Z axis direction and a third protrusion portion 330-3 that protrudes in the −Y axis direction. Since the right link 330 can be symmetric with respect to the left link 330 from the X axis, the one end 331 of the right link can include the second protrusion portion 330-2 that protrudes in the −Z axis direction and the third protrusion portion 330-3 that protrudes in the Y axis direction.

Before describing the second protrusion portion 330-2, the guide portion 325 of the link rod 320 is described first. Referring to FIG. 8A, the link rod 320 can include the guide portion 325 that protrudes to the inside, that is, in the +Z direction. The guide portion 325 can be formed in pair symmetric in the Y axis direction from the center of the link rod 320.

In addition, a lateral surface of the guide portion 325 can include a first inclined surface inclined at a preset angle from the Y axis direction. The first inclined surface of the pair of guide portions 325 can be inclined to become wider in the −X axis direction.

The one end 331 of the link can include the second protrusion portion 330-2 that protrudes in the −Z axis direction, the second protrusion portion 330-2 can meet the first inclined surface of the guide portion 325 that protrudes in the +Z axis direction in a direction close to the center of the link rod 320. The second protrusion portion 330-2 can include an inclined surface inclined at the same angle as that of the guide portion 325 on a lateral surface.

The second protrusion portion 330-2 can move to the center of the link rod 320 along the guide portion 325 to be parallel to the Y axis direction when the link rod 320 moves in the −Z axis direction. That is, the guide portion 325 guides the link to move in the Y axis direction.

In addition, the one end 331 of the link can include the third protrusion portion 330-3 that protrudes to the center of the link rod. The third protrusion portion 330-3 can protrude to a center portion of the link rod 320 from the one end 331 of the pair of links, and both terminal ends of the spring 340 can be linked with each of the third protrusion portion 330-3.

The spring 340 can push the pair of links 330 in a direction aligned with the Y axis direction and opposite to each other. The spring 340 can push the one end 331 of the link in a direction in which the extending portion 332 is formed.

As illustrated in FIG. 8A, under a circumstance that the grip 311 does not rotate, that is, a rotational force is not applied to the grip 311, due to the spring 340 that pushes the pair of links 330 in a direction opposite to each other, the one end 331 of the link can be located at a position of being met with the lateral surface 322 of the link rod 320 in the Y axis direction inside the link rod 320.

Each of the pair of one ends 331 of the link can be distanced in the Y axis direction as far as possible within a movable range in the link rod 320 by the spring 340, and, as a result, the second protrusion portion 330-2 pushes the guide portion 325 in a direction aligned with the Y axis direction and opposite to each other such that the link rod 320 is located at a maximum position movable in the +X axis direction.

Therefore, the second shaft 312-2 linked with the hinge portion 323 of the link rod 320 can be located parallel to the first shaft 312-1 on an XY plane.

As a result, the spring 340 maintains the link rod 320, the link 330, and the handle 310 in a state of being fixed without performing a linear motion or rotational motion in an initial state in which a rotational force is not applied to the handle 310, and even if a vehicle vibrates due to driving, the spring 340 allows the grip 311 not to be rotated by this and to be located parallel to the XY plane inside the groove 301-1 of the upper surface 301.

In addition, by the spring 340, the pair of links 330 are pushed in a direction aligned with the Y axis direction and opposite to each other, the first protrusion portion 330-1 which is the other end 333 of the link 330 can be combined with the pair of grooves 214 facing each other of the tray 210, and a combining of the groove 214 and the first protrusion portion 330-1 allows the box 300 to be fixed to the tray 210.

In some examples, the first protrusion portion 330-1 can be located on the lid 300-A of the box 300, and in this case the lid 300-A itself is fixed to the tray 210, the lid 300-A of the box 300 is opened during driving, and thereby it is possible to prevent items inside the multi-purpose box from scattering.

In some examples, as illustrated in FIG. 8B, in a case where the grip 311 is lifted up, that is, in a case where a rotational force is applied to the grip 311 and the grip 311 is lifted up in a direction 90° perpendicular to the upper surface 301 of the grip 311, the second shaft 312-2 can be located aligned with the first shaft 312-1 when seen from the Z axis direction as illustrated in FIG. 8B.

The second shaft 312-2 pulls the hinge portion 323 in the −X axis direction while rotating, and thus the link rod 320 including the guide portion 325 can move in the −X axis direction. However, since the one end 331 of the pair of links is fixed in the X axis direction, by the second protrusion portion 330-2 that meets the guide portion 325 as the guide portion 325 descends in the −X axis direction, the one end 331 of the pair of links moves in the Y axis direction to gather together to the center of the link rod 320.

In a case where an interval between both ends 331 is noted as P in FIG. 8A and an interval between the both one ends 331 is noted as P' in FIG. 8B, each of the links 330 can move by P-P'/2 in a direction parallel to the Y axis.

As the one end 331 of the link moves to the center of the link, the first protrusion portion 330-1, which is the other end 333 of the link, linked by the extending portion 332 can also move to the inner side of the lid 300-A. In some examples, a length by which the first protrusion portion 330-1 protrudes from the third lateral surface 302 can be the same as P-P'/2 within an error range. Therefore, in a situation like FIG. 8B, the first protrusion portion 330-1 can completely move to an inner space of the lid 300-A. Therefore, a combining between the first protrusion portion 330-1 and the groove 214 of the tray 210 is released, which allows the box 300 to be detached from the tray.

When a rotational force is applied to the grip 311, by switching a rotational motion of the grip 311 to a linear motion in the X axis direction using the second shaft 312-2 and the hinge portion 323, and switching a linear motion in the X axis direction to a linear motion in the Y axis direction using the inclined guide portion 325 and the second protrusion portion 330-2, the box 300 moves the first protrusion portion 330-1 to the inside of the box 300, and thereby allows the box 300 to be easily detached from the tray 210 by only lifting the grip 311.

In addition, as the first protrusion portion 330-1 moves to the inside of the box 300 only when the grip 311 is lifted, in a case where the box 300 is not used, the box 300 is fixed to the tray 210 to enable stable traveling.

Regarding implementations, only several implementations are described as described above, but the present disclosure can be implemented in various forms. The technical ideas of the above-described implementations can be combined in various forms as long as they are not incompatible, and new implementations can be realized through this.

It is obvious for a person skilled in the art that the present disclosure can be embodied in other specific forms within a range of not departing from the gist and the essential properties of the present disclosure. Therefore, the above detailed description should not be restrictively construed but should be construed as being exemplary in every respect. The scope of the present disclosure should be determined by reasonable interpretation of the attached claims, and all modifications within the equivalent range of the present disclosure should be construed to be included in the scope of the present disclosure.

What is claimed is:

1. A crash pad for a vehicle, comprising:
at least one tray having a lateral surface that defines at least one groove; and
a box detachably mounted to the at least one tray,
wherein the box comprises:
a handle,
a motion switch device configured to switch a rotational motion of the handle to a linear motion, and
a first protrusion portion configured to (i) protrude to an outer side of the box and engage with the at least one groove and (ii) move to an inside of the box based on the handle being rotated by the motion switch device,
wherein the handle comprises:
a first shaft that extends in a first direction and defines a rotational axis of the handle, and
a second shaft that is parallel to the first shaft and is linked with the first shaft, the second shaft being configured to rotate together with the handle based on rotation of the handle,
wherein the motion switch device comprises:
a link rod connected to the second shaft and configured to perform a linear motion in a second direction perpendicular to the first direction based on a rotational motion of the second shaft, the link rod comprising a guide portion that protrudes from an inner lateral surface and defines a first inclined surface inclined at a preset angle with respect to the first direction,
a link having (i) a first end located inside the link rod, (ii) an extending portion that extends from the first end of the link, and (iii) a second end that defines the first protrusion portion at an end of the extending portion, and
a spring that is disposed inside the link rod and configured to push the first end of the link in a direction toward the extending portion,
wherein the link rod comprises a hinge portion that defines a cross-section curved in a U shape and accommodates the second shaft therein, and
wherein the second shaft is configured to move in the hinge portion in a third direction perpendicular to both of the first direction and the second direction based on the handle rotating and moving the link rod in the second direction.

2. The crash pad according to claim 1, further comprising:
a main board disposed above an upper end of a Heating, Ventilation, and Air Conditioning (HVAC) system of the vehicle, the main board comprising the at least one tray on an upper end thereof;
a first duct cover that is coupled the main board and define a HVAC duct of the vehicle; and
a second duct cover having a pair of ends that are coupled to the main board and the HVAC system, respectively, the second duct cover defining another duct of the vehicle together with the main board.

3. The crash pad according to claim 1, wherein the at least one tray defines a space that has widths greater than 210 mm×297 mm and is configured to accommodate the box therein.

4. The crash pad according to claim 1, wherein the at least one groove comprises a pair of grooves facing each other.

5. The crash pad according to claim 1, wherein the first end of the link comprises a second protrusion portion that faces the first inclined surface in a direction toward a center of the link rod, and wherein the link is configured to perform a linear motion in the first direction based on the second protrusion portion moving along the guide portion while the link rod performs the linear motion in the second direction.

6. The crash pad according to claim 5, wherein the box comprises a main body and a lid linked with the main body, the lid defining an inner space, and wherein the second shaft and the motion switch device are disposed in the inner space of the lid.

7. The crash pad according to claim 5, wherein the link rod is slidingly coupled to the box.

8. The crash pad according to claim 5, wherein the motion switch device further comprises a plurality of link fixation members that support the link and are configured to allow the link to move in the second direction.

9. The crash pad according to claim 5, wherein the link is one of a pair of links that are symmetric with respect to an axis passing through the center of the link rod in the second direction, and wherein the guide portion is one of a pair of guide portions that are symmetric with respect to the axis passing through the center of the link rod in the second direction.

10. The crash pad according to claim 9, wherein the first inclined surfaces of the pair of guide portions are inclined to become wider in a direction toward the second shaft.

11. The crash pad according to claim 10, wherein the pair of links comprise a third protrusion portion that protrudes toward the center of the link rod, and wherein the spring is disposed at the third protrusion portion and configured to push the pair of links in opposite directions from each other.

12. The crash pad according to claim 11, wherein the spring is configured to maintain an initial state of the pair of links, the link rod, and the handle based on no rotational force being applied to the handle.

13. The crash pad according to claim 12, wherein the at least one groove comprises a pair of grooves facing each other, and wherein the first protrusion portion of the pair of links is coupled to one of the pair of grooves in the initial state.

14. The crash pad according to claim 10, wherein the second protrusion portion of the pair of links is configured to move toward the center of the link rod based on the first inclined surfaces of the pair of guide portions moving in the second direction.

15. The crash pad according to claim 14, wherein the first protrusion portion is configured to move to the inside of the box based on the second protrusion portion moving toward the center of the link rod.

* * * * *